United States Patent
Nakaoka

(10) Patent No.: US 10,425,590 B2
(45) Date of Patent: Sep. 24, 2019

(54) IMAGING APPARATUS, CONTROL METHOD, AND NON-TRANSITORY STORAGE MEDIUM

(71) Applicant: CANON KABUSHIKI KAISHA, Tokyo (JP)

(72) Inventor: Hiroshi Nakaoka, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 15/952,381

(22) Filed: Apr. 13, 2018

(65) Prior Publication Data

US 2018/0316838 A1    Nov. 1, 2018

(30) Foreign Application Priority Data

Apr. 26, 2017 (JP) .................. 2017-086921

(51) Int. Cl.
| | |
|---|---|
| *H04N 5/238* | (2006.01) |
| *H04N 5/232* | (2006.01) |
| *H04N 5/217* | (2011.01) |
| *H04N 5/369* | (2011.01) |

(52) U.S. Cl.
CPC .......... *H04N 5/238* (2013.01); *H04N 5/2173* (2013.01); *H04N 5/23212* (2013.01); *H04N 5/232122* (2018.08); *H04N 5/36961* (2018.08)

(58) Field of Classification Search
CPC ................. H04N 5/238; H04N 5/2173; H04N 5/232122; H04N 5/36961; H04N 5/23212; H04N 5/343; H04N 5/3559; H04N 5/37457; H04N 5/347; H04N 5/3696
See application file for complete search history.

(56) References Cited

U.S. PATENT DOCUMENTS

| 6,933,978 B1 | 8/2005 | Sudo | |
|---|---|---|---|
| 2002/0036257 A1* | 3/2002 | Yamashita | ......... H04N 5/23212 250/208.1 |
| 2004/0036785 A1* | 2/2004 | Takayanagi | ............ H04N 3/155 348/308 |

(Continued)

FOREIGN PATENT DOCUMENTS

JP          2001-124984 A      5/2001

*Primary Examiner* — Lin Ye
*Assistant Examiner* — Tuan H Le
(74) *Attorney, Agent, or Firm* — Cowan, Liebowitz & Latman, P.C.

(57) ABSTRACT

According to an aspect of the invention, an imaging apparatus includes: a read unit configured to perform a first driving that reads image signals from each of photoelectric conversion units and a second driving that simultaneously reads image signals from the photoelectric conversion units, the photoelectric conversion units receiving light that passes through pupil regions having different imaging optical systems; a compensating unit configured to perform a process of compensating a first linearity based on the image signals obtained by the first driving and a second linearity based on the image signals obtained by the second driving, each of the first and second linearities being a relation between an amount of light incident to the photoelectric conversion unit and a brightness of the image signals read by the reading unit; and a generating unit configured to generate an image signal for recording by adding the image signals compensated the first linearity by the compensating unit.

10 Claims, 6 Drawing Sheets

(56) References Cited

U.S. PATENT DOCUMENTS

| | | | | |
|---|---|---|---|---|
| 2005/0052547 A1* | 3/2005 | Minakuti | ............... | H04N 9/735 |
| | | | | 348/224.1 |
| 2008/0284889 A1* | 11/2008 | Kinoshita | ............... | H04N 5/361 |
| | | | | 348/308 |
| 2008/0291311 A1* | 11/2008 | Kusaka | ................. | G02B 7/346 |
| | | | | 348/308 |
| 2010/0141819 A1* | 6/2010 | Fowler | .............. | H01L 27/14609 |
| | | | | 348/302 |
| 2010/0329584 A1* | 12/2010 | Katou | ....................... | G06T 1/20 |
| | | | | 382/266 |
| 2012/0092537 A1* | 4/2012 | Katagiri | ............... | H04N 5/2355 |
| | | | | 348/294 |
| 2015/0358562 A1* | 12/2015 | Egawa | ................. | H04N 5/343 |
| | | | | 348/250 |
| 2017/0064226 A1* | 3/2017 | Ishii | ....................... | H04N 5/361 |

* cited by examiner

IMAGING APPARATUS, CONTROL METHOD, AND NON-TRANSITORY STORAGE MEDIUM

BACKGROUND OF THE INVENTION

Field of the Invention

The present invention relates to an imaging apparatus, a control method, and a storage medium.

Description of the Related Art

Japanese Patent Application Laid-Open No. 2001-124984 discloses an imaging apparatus that includes an imaging element having a pixel unit in which a plurality of photoelectric conversion units is arranged for a microlens, and reads image signals in a state in which an exit pupil of an imaging optical system is split. Hereinafter, splitting the exit pupil and reading the image signals is referred to as "split-read".

Due to the properties of an electric element such as a transistor configuring a read circuit of the imaging element, an electric signal proportional to the brightness of an object image is not obtained in some cases. Hence, in terms of image signals, a linearity of brightness and color is lost. Additionally, in the imaging apparatus that includes the imaging element having the pixel unit in which the photoelectric conversion units are arranged for the microlens and splits the exit pupil and reads image signals, generating a recording image signal by adding a split-read image may cause the problem below. In this imaging apparatus, due to the loss of the linearity described above, a difference in signal level between an image signal acquired by adding the split-read image signal and an image signal that has been read one time from the pixel unit without split-read. Accordingly, it is impossible to correctly determine a compensation value even in attempting the compensation of the linearity after the split-read image signal is added. As a result, a high quality image cannot be obtained if the image signals to be output are viewed as one frame-image.

SUMMARY OF THE INVENTION

The present invention provides an imaging apparatus that can generate high quality image signals, based on a first driving that reads pixel signals from an imaging element in a state in which an exit pupil is split and a second driving that reads image signals one time from the pixel unit of the imaging element.

According to an aspect of the invention, an imaging apparatus comprises: a read unit configured to perform a first driving that reads image signals from each of photoelectric conversion units and a second driving that simultaneously reads image signals from the photoelectric conversion units, the photoelectric conversion units receiving light that passes through pupil regions having different imaging optical systems; a compensating unit configured to perform a process of compensating a first linearity based on the image signals obtained by the first driving and a second linearity based on the image signals obtained by the second driving, each of the first and second linearities being a relation between an amount of light incident to the photoelectric conversion unit and a brightness of the image signals read by the reading unit; and a generating unit configured to generate an image signal for recording by adding the image signals compensated the first linear sty by the compensating unit.

Further features of the present invention will become apparent from the following description of exemplary embodiments with reference to the attached drawings.

DESCRIPTION OF THE EMBODIMENTS

Figure 1:
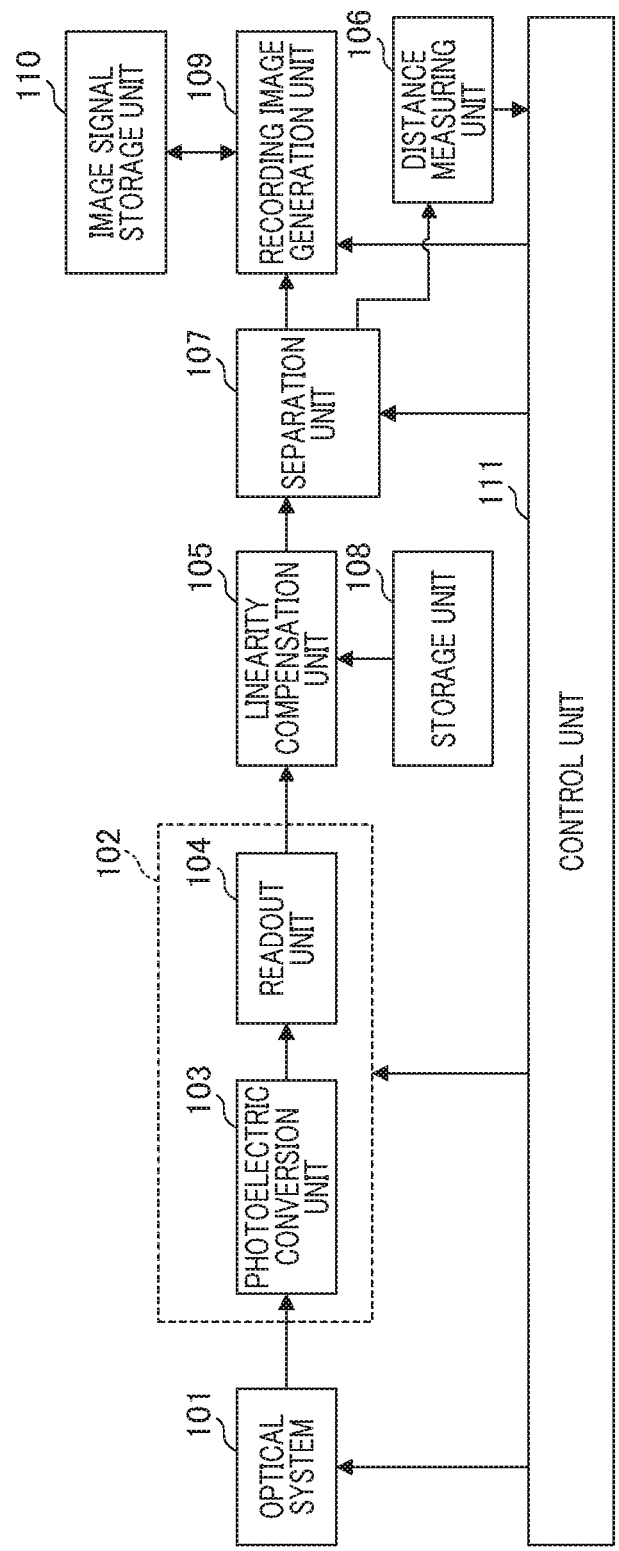
FIG. 1 illustrates a configuration example of an imaging apparatus.

FIG. 1 illustrates a configuration example of an imaging apparatus according to the present embodiment. An imaging optical system 101 images a light beam emitted from an object (not illustrated) to serve as an object image. The imaging optical system 101 includes at least one or more of a focus lens for focusing on an object and its control mechanism, a zoom lens for changing a focal length and its control mechanism, and a diaphragm mechanism for adjusting an amount of incident light.

An imaging element 102 converts an object image into an electric signal by photoelectric conversion and outputs the converted electric signal as an image signal. The imaging element 102 is controlled in accordance with imaging element driving information, which serves as a control signal from a control unit ill to be described below. A photoelectric conversion unit 103 converts the object image obtained from the optical system 101 into an electric signal corresponding to the brightness of the object image. A read unit 104 sequentially outputs the electric signal that has been converted by the photoelectric conversion unit 103 from the imaging element 102.

A linearity compensation unit 105 performs a process of compensating the image signal output from the imaging element 102 for the linearity between an amount of light included in the object image and the brightness of the image signal corresponding to the amount of light (signal correction process). The linearity compensation unit 105 performs a signal correction process on the image signal, based on parameters (hereinafter, referred to as "correction parameters") stored in a storage unit 106 to be described below.

The storage unit 106 stores correction parameters to be used for the signal correction process performed by the linearity compensation unit 105 in advance. A separation unit 101 separates the image signal in which the linearity has been compensated for by the linearity compensation unit 105 into an input signal to a recording image generating unit 109 and an input signal to a distance measuring unit 108 based on a separation control signal from the control unit 111. The input signal to the distance measuring unit 108 is an image signal for measuring a distance (hereinafter, also referred to as a "distance measuring image signal").

The distance measuring unit 108 calculates information about a distance from the imaging apparatus to the object based on the distance measuring image signal that has been separated and output by the separation unit 107. The control unit 111 executes an automatic focus adjustment operation by controlling the focus lens based on a defocus amount corresponding to the calculated distance. The recording image generating unit 109 generates an image signal for recording (hereinafter, also referred to as a "recording image signal") based on the image signal that has been input from the separation unit 107. The timing for generating image signal is controlled based on an addition control signal, which serves as a control signal from the control unit 111 to be described below. An image signal storage unit 110 is a storage unit used for buffering an image signal as a line memory if the recording image generating unit 109 generates an image signal. The control unit 111 controls the entire imaging apparatus. The control unit 111 outputs the control signal for controlling the imaging element 102, the separation unit 107, and the recording image generating unit 109.

Figure 2:
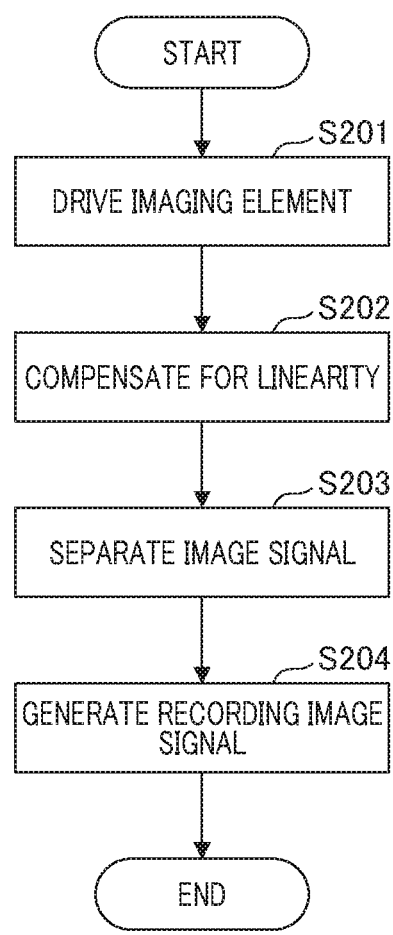
FIG. 2 is a flowchart illustrating an example of an operation process of the imaging apparatus.

FIG. 2 is a flowchart illustrating an example of an operation process of the imaging apparatus. In step S201, the control unit 111 drives the imaging element 102. The imaging element 102 converts the object image from the imaging optical system 101 into an electric signal based on the imaging element driving information from the control unit 111, and outputs the electric signal. In this context, a method for reading the image signal from the imaging element 102 will be described with reference to FIGS. 3, 4, and 5.

Figure 3:
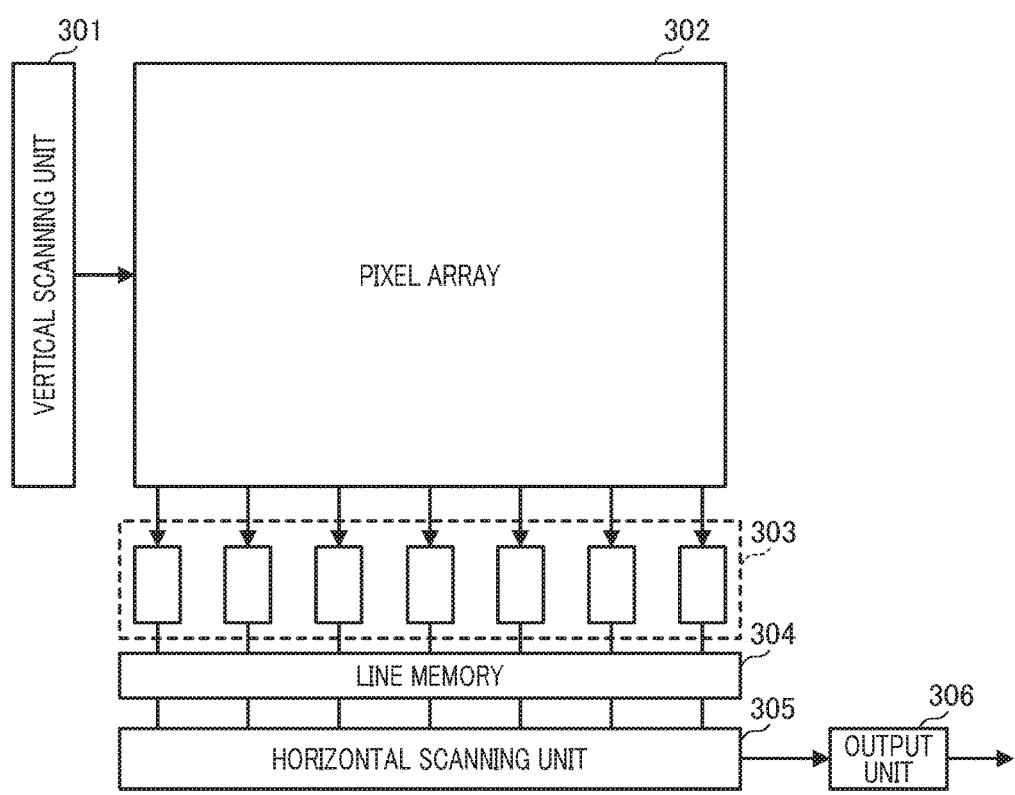
FIG. 3 illustrates an example of a configuration of an imaging element.

FIG. 3 illustrates an example of a configuration of the imaging element. A vertical scanning unit 301 determines image signals to be output in units of rows, based on the imaging element driving information from the control unit 111 and outputs the control signal for reading an image signal to a pixel array 302. The pixel array 302 reads the image signal based on the control signal from the vertical scanning unit 301. A column AD conversion unit 303 converts the signal that has been read from the pixel array 302 in the column direction into a digital signal. The column AD conversion unit 303 Includes a voltage comparator (comparator) and a counter in each column. The signal from the pixels is input as an analog signal to one end of the comparator. A ramp waveform is applied to the other end of the comparator, and the conversion to the digital signal is realized with a counter value when the comparators on each column are inverted. A line memory 304 temporarily stores the digitized image signal that has been output from the column AD conversion unit.

A horizontal scanning unit 305 sequentially reads the image signals stored in the line memory 304. Accordingly, the horizontal scanning unit 305 sequentially outputs the image signals that have been read from the pixel array 302 in row units. An output unit 306 converts the image signals output from the horizontal scanning unit 305 into a predetermined format. The predetermined format is, for example, a differential transfer format such as LVDS (Low Voltage Differential Signaling), which is a standard commonly known. Accordingly, the digital signal is transmitted with a small amplitude voltage, thereby suppressing power consumption of the imaging apparatus. Subsequently, the details of the pixel array 302 will be described below with reference to FIG. 4 and FIG. 5.

Figure 4:
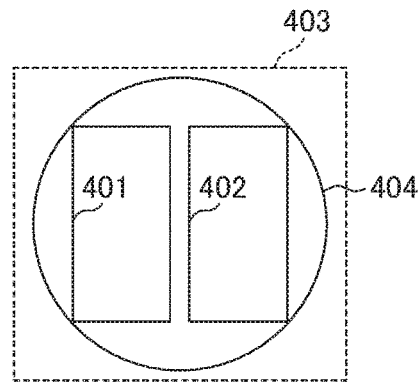
FIG. 4 illustrates a configuration example of a pixel unit of a pixel array.

FIG. 4 illustrates a configuration example of a pixel unit of the pixel array. A pixel unit 403 has a plurality of photoelectric conversion units typified by "photodiodes" that convert incident light into an electric charge. In the example shown in FIG. 4, the pixel unit 403 has two photoelectric conversion units 401 and 402. The photoelectric conversion units 401 and 402 correspond to the photoelectric conversion unit 103 in FIG. 1. The pixel unit 403 has a structure including one microlens 404 that is common to the photoelectric conversion units. The photoelectric conversion unit 401 and the photoelectric conversion unit 402 receive light that has passed through different pupil regions (exit pupils) of the imaging optical system. This structure enables acquiring an image signal corresponding to an image with parallax (a parallax image) in a state in which the exit pupil is split. Additionally, another pixel unit present on the imaging element 102 also has photoelectric conversion units in the positional relation shown in the drawing.

Figure 5:
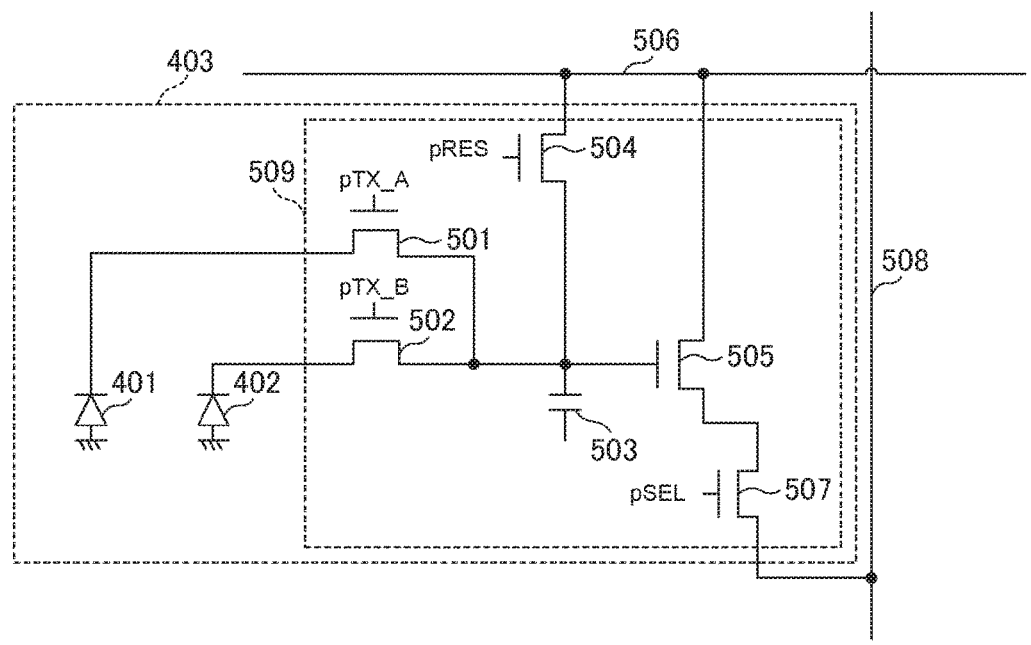
FIG. 5 is a part of a read circuit of the pixel array.

FIG. 5 illustrates a part of a read circuit of the pixel array. A floating diffusion unit (hereinafter, referred to as "FD") 503 is an accumulation region that temporarily accumulates charges generated by the photoelectric conversion units 401 and 402. A first transfer switch 501 transfers the charges generated in the photoelectric conversion unit 401 to the FD 503 by the transfer pulse pTX_A. A second transfer switch 502 transfers the charges generated by the photoelectric conversion unit 402 to the FD 503 by the transfer pulse pTX_B.

A reset switch 504 removes the charges accumulated in the FD 503 by the reset pulse pRES. An amplifying MOS (Metal-Oxide-Semiconductor) amplifier 505 functions as a source follower amplifier. The reset switch 504 and the amplifying MOS amplifier 505 are connected to a power supply line 506. A selection switch 507 is a switch for selecting image signals in the pixel array, which are to be read in row units. The gate electrodes of the first transfer switch. 501, the second transfer switch 502, the reset switch 504, and the selection switch 507 are respectively connected to signal lines that supply pTX_A, pTX_B, pRES, and pSEL in units of rows. Subsequently, the image signal is selected and scanned by the vertical scanning unit 301 provided in the imaging element.

A vertical output line 508 outputs an output signal from each pixel unit in the column direction of the imaging element. A read unit 509 corresponds to the read unit 104 in FIG. 1. The read unit 509 amplifies an electric signal that has been converted by the photoelectric conversion units 401 and 402 and outputs the amplified electric signal as an image signal from the imaging element 102. Additionally, in reading the image signal from the imaging element 102, the read unit 509 sequentially reads a plurality of pixel units 403 arranged in the horizontal direction on the imaging element 102 in row units. The image signal that has been read is output from the pixel array 302 via the vertical output line 508. According to the configuration described above, for example, in a certain row, the read unit 509 performs a first driving that reads each of the charges accumulated in the photoelectric conversion unit 401 and the photoelectric conversion unit 402. The first driving is an operation of splitting the exit pupil and reading image signal. The image signals corresponding to the electric charges read from the photoelectric conversion unit 401 (for example, D0(A) in FIG. 8) and the image signals corresponding to the electric charges read from the photoelectric conversion unit 402 (for example, D1(B) in FIG. 8) are both referred to as first image signals. The image signals read from each of the photoelectric conversion unit 401 and the photoelectric conversion unit 402 correspond to parallax images. In another row, the read unit 509 performs a second drive that simultaneously reads (one time) the charges accumulated in the photoelectric conversion unit 401 and the photoelectric conversion unit 402. The image signals read from the photoelectric conversion unit. 401 and the photoelectric conversion unit 402 by the second driving are referred to as second image signals.

The description will return to FIG. 2. In step S202, the linearity compensation unit 105 performs a process of compensating the image signal that has been read by the read unit 509 for the linearity of an amount of light incident on the photoelectric conversion unit between the brightness of the image signal, with respect to the first driving and the second driving above described. Specifically, the linearity compensation unit 105 reads the correction parameters stored in the storage unit 106 and applies the parameters to the image signals.

Figure 6:
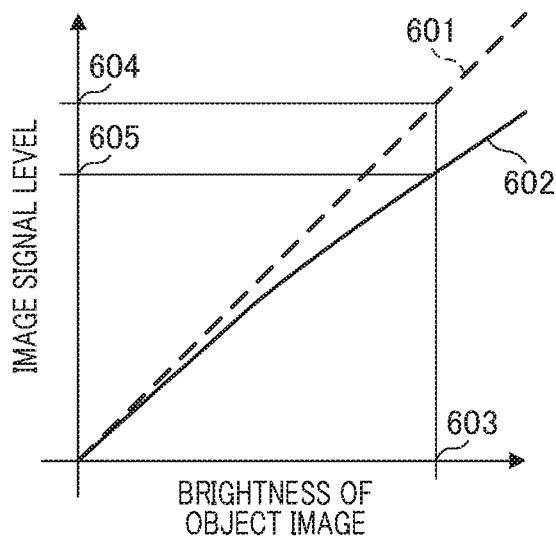
FIG. 6 illustrates a relation between a brightness of an object and a signal level of an image signal input on a linearity compensation unit.

FIG. 6 illustrates the relation between the brightness of the object and the signal level of the image signal input to the linearity compensating unit. The horizontal axis of the graph shown in FIG. 6 shows the brightness of the object image. The vertical axis shows the signal level of the image signal. Normally, as indicated by 601, the signal level of the image signal obtained in response to the brightness of the object image needs to be linear (proportional relation). However, due to a characteristic of an electric element such as a transistor configuring the read unit 104 formed in the imaging element 102, the electrical signal proportional to the brightness of the object image cannot be obtained in some cases. In such a case, for example, as shown by reference numeral 602, an image signal with the non-linear property can be obtained. Although a signal level shown by reference numeral 604 is normally obtained serving as an image signal to the object image with a given brightness 603, a lower signal level shown by reference numeral 605 is obtained due to the non-linearity property. Accordingly, the linearity compensation unit 105 performs a process of compensating for the linearity for the image signal by using the correction parameters stored in the storage unit 106 (signal correction process).

Figure 7:
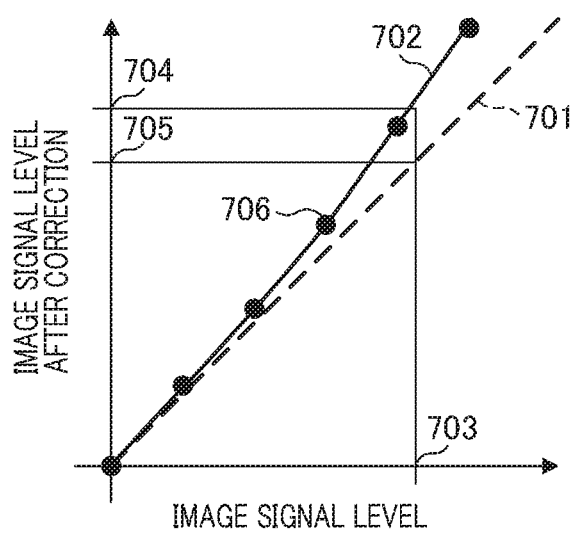
FIG. 7 illustrates a signal level of the image signal after a signal correction process in relation to the image signal with non-linearity property shown in FIG. 6.

FIG. 7 illustrates a signal level of the image signal after a signal correction process is performed on the image signals with the non-linearity property shown in FIG. 6. The linearity compensation unit 105 performs a signal correction process so as to an obtain image signal with a relation proportional to the brightness of the object image in accordance with the signal level of the input image signal. Reference numeral 701 shows the correlation between the input image signal level and the output image signal level the signal correction processing is not performed. As shown by reference numeral 702, the linearity compensation unit 105 performs the signal correction process so as to amplify the signal level of the input image. Consequently, the linearity of the image signal with respect to the brightness of the object image shown in FIG. 6 is compensated. For example, before the signal correction process is performed, the signal level of the input image shown by reference numeral 703 remains that shown by the reference numeral 705. However, by the signal correction process, the signal level is compensated for up to the signal shown by reference numeral 704. The linearity compensation unit 105 reads the correction parameters from the storage unit 106 and amplifies the signal level of the input image with the correction parameters.

To prevent the number of correction parameters stored in the storage unit 106 from depending on the gradation of the signal level of the input image, as shown by black dots such as reference numeral 706, the correction parameters may be discretely stored in the storage unit 106 by a number smaller than the gradation of the signal level of the input image. The linearity compensation unit 105 generates correction parameters corresponding to a section where the correction parameters are not present due to an interpolation process and the like based on the correction parameters stored in the storage unit 106. Consequently, it is possible to reduce the number of correction parameters to be stored in the storage unit 106.

The description will return to FIG. 2. In step S203, the separation unit 107 separates the image signal after the signal correction process, which has been output from the linearity compensation unit 105, into the output to the recording image generating unit 109 and the output to the distance measuring unit 108 (distance measurement image signal). The separation unit 107 separates the image signal to the subsequent process circuit based on the separation control signal transmitted from the control unit 111.

Figure 8:
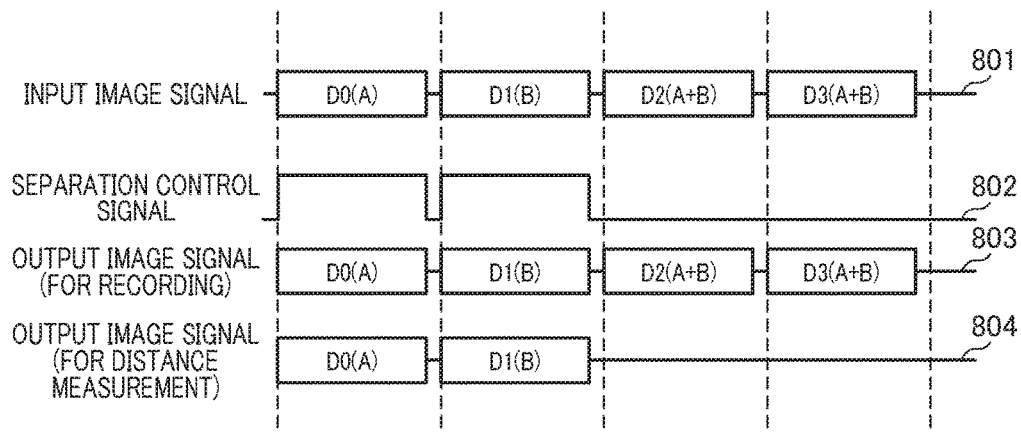
FIG. 8 is a timing chart showing a separation of the image signal by a separation unit.

FIG. 8 is a timing chart showing the separation of an image signal that has been input by the separation unit. An image signal 801 is an input image signal, specifically, an image signal subjected to the signal correction process by the linearity compensation unit 105. The interval between the dotted lines in the drawing shows a period of time during which the image signal of one line is output.

A separation control signal 802 is a control signal output from the control unit 111 for selecting a distance measurement image signal. The separation control signal 802 controls the image signal read by splitting the exit pupil so as to be selected in row units. An output image signal 803 is output from the separation unit 107 to the recording image generating unit 109 and is used for generating the recording image signal. The output image signals 803 for all the lines are output.

An output image signal 804 indicates the distance measurement image signal. The output image signal 804 is input to the distance measuring unit 108. In accordance with the separation control signal 802, the separation unit 107 outputs the first image signal (D0(A), D1(B)) that has been read by the first driving that splits and reads the exit pupil to serve as the distance measurement image signal. The distance measuring unit 108 calculates a distance from the imaging apparatus to the object based on the distance measurement image signal. Specifically, the distance measuring unit 108 acquires the correlation between two images, that is, D0(A) and D1(B). The digitization of the correlation is obtained by calculating a sum of absolute differences. The distance measuring unit 108 calculates a deviation amount between two images based on the calculated correlation value, and calculates a distance to the object based on the calculated deviation amount. Additionally, the control unit 111 adjusts a part of the lenses configuring the imaging optical system 101 based on the distance to the object that has been calculated and performs focusing on the object.

The description will return to FIG. 2. In step S204, the recording image generating unit 109 generates a recording image signal based on the separated image signal (an output image signal 803 in FIG. 8) that has been output from the separation unit 107.

Figure 9:
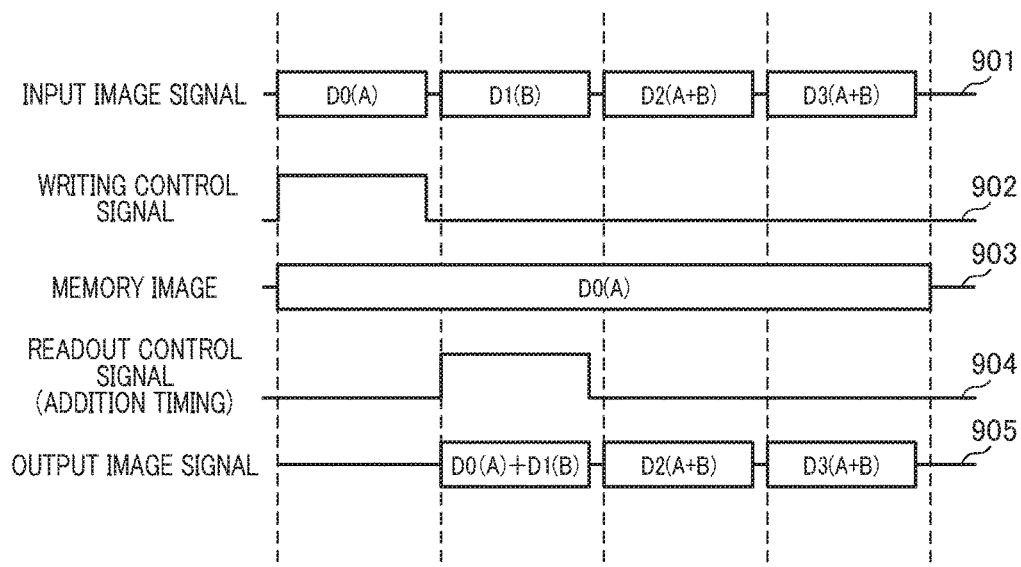
FIG. 9 is a timing chart showing timing for generating a recording image signal.

FIG. 9 is a timing chart showing the timing for generating the recording image signal by the recording image generating unit 109. An input image signal 901 indicates the separated image signal that has been output from the separation unit 107. The interval between the dotted lines in the drawing shows a period of time during which the image signal of one line is output. In the input image signal 901, the first image signal (D0(A), D1(B)) read by the first driving that splits and reads the exit pupil and the second image signal (D2(A+B), D3(A+B)) read by the second driving are mixed. A writing control signal 902 is a control signal for selecting a part of the input image signal and temporarily storing it in the image signal storage unit 110 in order to perform a process of adding the first image signal. The writing control signal 902 is one of the addition control signals transmitted from the control unit 111. A memory image 903 is an image related to the image signal stored in the image signal storage unit 110. The image signal in which the writing control signal 902 has been written at the timing Hi is stored in the image signal storage unit 110 to serve as the memory image 903.

A read control signal 904 is a control signal for temporarily reading the image signal stored in the image signal storage unit 110 in order to perform the process of adding the first image signal. The read control signal 904 is also one of the addition control signals from the control unit 111. An output image signal 905 is a recording image signal output from the recording image generating unit 109. The recording image generating unit 109 adds the image signal D0(A) and D1(B) of the input image signal 901 read at the timing when the read control signal 904 becomes Hi to generate a new image signal (D0(A)+D1(B)). The recording image generating unit 109 outputs the generated image signal (D0(A)+D1(B)) and the second image signal (D2(A+B), D3(A+B)) to serve as the recording image signals.

In splitting the exit pupil and reading pixel signal from the imaging element to generate each of the distance measurement image signal and the recording image signal, the imaging apparatus of the present embodiment compensates for the linearity of the signal before the recording image signals are generated, separates the signal into the distance measurement image signal and the recording image signals after the compensation of the linearity, and performs processes on both the signals. Hence, it is possible to reduce a deterioration in the image quality of the recording image signal. Although the present embodiment has described the example in which, in the imaging element 102, the exit pupil is split and read for a part of the image signal, it may be possible that the exit pupil is split and read for all the image signals so generate the recording image signals and the distance measurement image signals, with a configuration that is the same as the present embodiment.

Other Embodiments

The present invention can also be realized by a process in which a program that implements one or more functions of the above embodiment is supplied to a system or an apparatus via a network or a storage medium, and one or more processors in a computer of the system or the apparatus read and execute the program. Additionally, the present invention can also be realised by a circuit (for example, ASIC (Application Specific Integrated Circuit)) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-086921 filed on Apr. 26, 2017, which are hereby incorporated by reference herein in its entirety.

What is claimed is:

1. An imaging apparatus comprising:
  a read unit configured to perform a first driving that reads image signals from each of photoelectric conversion units and a second driving that simultaneously reads image signals from the photoelectric conversion units, the photoelectric conversion units receiving light that passes through pupil regions having different imaging optical systems;
  a compensating unit configured to perform a process of compensating a first linearity based on the image signals obtained by the first driving and a second linearity based on the image signals obtained by the second driving, each of the first and second linearities being a relation between an amount of light incident to the photoelectric conversion unit and a brightness of the image signals read by the reading unit; and
  a generating unit configured to generate an image signal for recording by adding the image signals compensated the first linearity by the compensating unit.

2. The imaging apparatus according to claim 1 further comprising:
  a storing unit configured to store first parameters for compensating the first and second linearities,
  wherein the compensating unit performs the process on the basis of the first parameters stored in the storing unit.

3. The imaging apparatus according to claim 2
  wherein the storage unit stores second parameters having a gradation lower than a gradation of a signal level of the image signals, and
  the compensating unit generates the first parameters by an interpolation process based on the second parameters stored in the storage unit.

4. The imaging apparatus according to claim 1, further comprising:
  a calculation unit configured to calculate information about a distance to an object, and
  a separating unit configured to separate the image signals performed the process into input signals to the calculation unit and input signals to the generating unit.

5. The imaging apparatus according to claim 4,
  wherein the separating unit outputs the image signals that read by the first driving and are performed the process, as input signals to the calculation unit, and
  the calculation unit calculates the information about the distance as information corresponding to a defocus amount.

6. The imaging apparatus according to claim 5, further comprising:
  a control unit configured to control a focus lens in the imaging optical systems, based on the defocus amount.

7. The imaging apparatus according to claim 1,
  wherein the input signals to the generating unit include first image signals that read by the first driving and second image signals that read by the second driving, and
  the generating unit generates the image signal for recording by adding the first image signals and outputs the image signal and the second image signals as final image signals for recording.

8. The imaging apparatus according to claim 1, further comprising:
  an imaging element including a pixel unit and the read unit,
  wherein the pixel unit has photoelectric conversion units corresponding to one microlens.

9. A control method comprising:
  performing a first driving that reads image signals from each of photoelectric conversion units and a second driving that simultaneously reads image signals from the photoelectric conversion units, the photoelectric conversion units receiving light that passes through pupil regions having different imaging optical systems;

performing a process of compensating a first linearity based on the image signals obtained by the first driving and a second linearity based on the image signals obtained by the second driving, each of the first and second linearities being a relation between an amount of light incident to the photoelectric conversion unit and a brightness of the image signals read by the reading unit; and generating an image signal for recording by adding the image signals compensated the first linearity by the compensating unit.

10. A non-transitory storage medium on which is stored a computer program for making a computer execute a control method, the control method comprising:

performing a first driving that reads image signals from each of photoelectric conversion units and a second driving that simultaneously reads image signals from the photoelectric conversion units, the photoelectric conversion units receiving light that passes through pupil regions having different imaging optical systems;

performing a process of compensating a first linearity based on the image signals obtained by the first driving and a second linearity based on the image signals obtained by the second driving, each of the first and second linearities being a relation between an amount of light incident to the photoelectric conversion unit and a brightness of the image signals read by the reading unit; and generating an image signal for recording by adding the image signals compensated the first linearity by the compensating unit.

* * * * *